United States Patent Office 3,142,500
Patented July 28, 1964

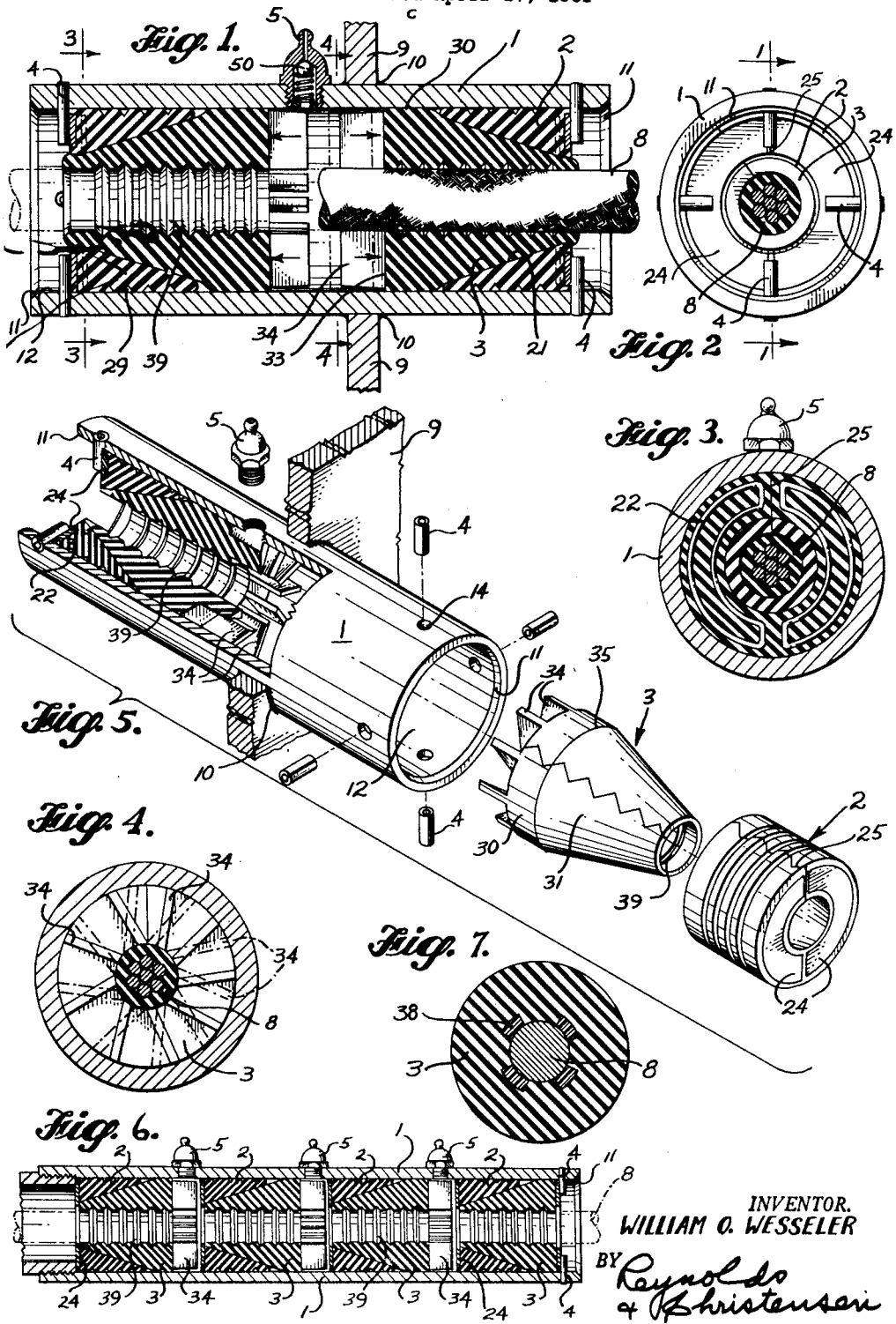

3,142,500
PRESSURE ACTUATED BULKHEAD CABLE SEAL
William O. Wesseler, Rte. 5, Box 970,
Bremerton, Wash.
Filed Apr. 17, 1961, Ser. No. 103,367
1 Claim. (Cl. 285—96)

This invention concerns the sealing about an element such as a cable or insulated electric lead where it passes through a hole in a bulkhead. Such a cable is usually enclosed in soft insulating material, and the sealing means heretofore used under such circumstances have required high initial pressure which tended to squeeze, extrude and deform the surrounding soft material because of the high radical pressures always present in the seal. This deformation of the soft material in turn requires still greater pressure, and accompanying deformation. The end results are a seal which is not tight throughout any wide range of pressures or temperatures, nor after but few cycles of pressure or temperature change, and early destruction of the insulation and impairment of the cable as a whole.

It is a primary object of this invention to provide a seal for such use that needs but minimal initial pressure, such as will not harmfully deform the insulation, yet a seal which will increase the radial pressures automatically to the extent necessary to insure against leakage, as a result of the application of external pressure to be sealed against, but in a manner to avoid appreciable permanent deformation of the insulation, and will decrease such radial pressures when the external pressure is relieved, wherefore the seal will remain tight throughout wide ranges of temperature and pressure, and over repeated cycles.

It is a further object to provide a seal which employs a smooth-bored tube of uniform bore diameter throughout its length, yet in which means of simple nature are provided for back-stopping internal pressures or for allowing disassembly of the seal when necessary.

It is a further object to provide a seal having the capabilities and characteristics indicated which is a lasting seal, such as does not require repacking to maintain it tight, but which if leakage should occur can be retightened merely by the insertion from outside the seal of a fluid type sealant, and particularly a sealant which, though semi-fluid, never hardens nor oxidizes with heat or age and can always be readily disassembled.

The seal has been described as applicable to the sealing of an electric lead or cable having a soft sheathing of insulation, where it passes through a bulkhead, but the seal is equally applicable to the sealing of a rod, shaft, or the like within a bulkhead, and regardless of whether the member sealed rotates or reciprocates. It is, however, particularly applicable to a cable or electric lead, and will be so described, but it should be remembered that references to the cable apply equally to the rod, shaft or the like that may be sealed instead of the electric lead. Indeed, in the case of a rod, shaft or the like the minimal pressure employed reduces friction and wear, yet like a cable seal, is self-compensating as to internal packing pressure in accordance with increase or decrease of external pressure sealed against.

Another object is to form the seal in such a way that air is expelled from its interior before initial sealing pressure develops, wherefore the seal is not subject to pressure variations due to temperature changes that would affect entrapped air, but will have little effect on the fluid-like sealant that fills its interior.

Where the seal is about relatively moving parts a lubricant can be employed for the fluid pressure agent, and resealing and lubrication of the gland is then accomplished simultaneously.

The internal pressure of the sealant, which should initially be minimal or nominal, can be indicated and determined through the degree of extrusion of one of the elements of the seal assembly.

It is also an object to provide a seal of this nature which will seal equally well on square, splined, hexagon, or irregularly shaped sliding shafts and rods as well as on round sections.

Speaking generally, because of the adaptability of the seal of this invention to a wide range of materials it can be used to seal over a wide range of temperatures and pressures, against either corrosive or non-corrosive liquids, gases, or semi-solids.

With these objects in mind and others as will appear more fully hereinafter, the invention comprises the novel seal disclosed in several forms of execution in the accompanying drawings, and as will be more fully explained hereinafter and defined in the claim at the end of this specification.

FIGURE 1 is generally an axial sectional view of a simple form of the seal, shown in operative relation to a cable, as the latter term has been broadly defined above.

FIGURE 2 is an end elevation of the seal.

FIGURE 3 is a transverse sectional view through the seal taken at the line 3—3 of FIGURE 1.

FIGURE 4 is a cross-sectional view through the seal substantially at the line 4—4 of FIGURE 1.

FIGURE 5 is an isometric view, partly in section and partly exploded, illustrating at one end the assembled seal and at the opposite end an exploded complemental seal.

FIGURE 6 is an axial sectional view similar to FIGURE 1 but illustrating a cascaded or multiple seal, according to this invention.

FIGURE 7 is a transverse sectional view through a part of the seal in a form well adapted to rotative or sliding seals.

The seal is illustrated in conjunction with the passage of a cable through a bulkhead in a vessel, which requires the sealing against leakage of the cable within the hole in the bulkhead through which it passes. The hole in the bulkhead is made appreciably larger in diameter than the cable which passes through it, and within this hole a tube or pipe nipple is water-tightly secured, for example, by welding, and the cable extends through the bore of the tube. This bore is appreciably larger than the diameter of the cable. Each seal assembly includes two resiliently deformable elements, both of which might be termed sleeves, but which for ready differentiation are termed one, a ring, and the other a sleeve. The ring fits closely within the bore of the tube, and its own bore is tapered so that the ring becomes a female conical member. The complemental male member is complementally conically tapered externally, and its bore fits closely about the cable. The larger end of the sleeve is located interiorly of the tube, and the larger external end of the ring is engaged by a backstop which can be removed for replacement of the seal, but which is normally in place to limit the outward movement of the female ring. The ring preferably is of an internal diameter at its larger end slightly greater than the diameter of the cable, and the male sleeve at its larger end is of the full diameter of the bore of the tube. Opposite this larger end of the male sleeve, and spaced therefrom, is a closure for the opposite end of the tube, and while this may take various forms preferably the closure is a similar seal assembly, directed oppositely however, and spaced from the first to leave an annular chamber between them. A fluid pressure agent, the nature of which will be more fully described hereinafter, is admitted into this annular chamber, and its rather low pressure reacting between the closure and the entire area of the larger end of the male sleeve urges the sleeve outwardly, and by reaction with the female ring produces radially acting component forces to effect sealing engagement between the sleeve and the cable and between the ring and the bore of the tube. Provision is made for escape of air from within the chamber. Now if external pressure should be applied to the larger external end of the female ring, this external pressure only produces an increase in the radial forces reacting between the male and female elements, which causes these elements to press more tightly the tube's bore and the cable respectively, and to increase pressure upon the sealant fluid, so that the sealant's sealing effect varies with the external pressure applied, and the initial pressure of the pressure fluid admitted to the annular chamber need be only nominal or minimal. As just stated, the fluid pressure agent within the chamber is acted upon by the tendency of external pressure to decrease the volume of that chamber, and this increased pressure within the chamber resists swelling or other deformation of the cable's sheath within the chamber.

Where two such seal assemblies are employed back to back, provision is made to maintain them spaced apart initially, and preferably by means which tends to effect rotation of the male sleeve relative to the female ring under the influence of the initial pressurization, which rotational effect tends to insure expulsion of air from the annular chamber.

Several such seal assemblies may be arranged in a single tube in tandem or multiple so that the cascaded effect, reacting through the pressure fluid agent within each successive annular chamber, merely tends to urge the next male sleeve more tightly in place, and the total effect is to provide a seal which is adequate for pressures which have been tested through the range from a fraction of a pound per square inch to 3000 p.s.i., and over a temperature range of −100° F. to +300° F. on continuous service, and up to 1500° F. for intermittent service.

The bulkhead is indicated at 9, and a sleeve 1, preferably smooth-bored, is secured water-tightly, as by welding at 10, in a hole in the bulkhead, extending at both faces of the latter. For convenience of assembly each entrance to the tube's bore is chamfered as at 11.

The element to be sealed, hereinafter termed a cable, is indicated at 8 and may be a rotating or sliding shaft, a rod, or it may be, and the present invention is particularly designed to seal, an electric lead sheathed in a deformable external sheath or insulation. Such a sheath is readily and harmfully deformable by excessive, continuing and increasing pressures in the seal, but by reason of the fact that the present seal requires only minimal initial pressures, such a sheathed cable will not be deformed, the more so as it is subjected throughout its entire length, including that exposed within the seal, to similar pressures.

Each seal assembly includes two complemental elements, a ring 2 of deformable material such as soft neoprene, and a sleeve 3 of similar material. The external periphery of the ring 2 fits closely within the bore 12 of the tube 1, and the ring 2 is internally tapered at 21. The sleeve 3 is complementally tapered externally at 31 to fit the tapered bore 21 of the ring 2, but preferably the sleeve 3 has also a cylindrical portion 30 which is of a diameter to fit closely within the bore 12 of the tube 1. The axial extent of this is not highly important. This insures that the entire larger end 33 of the sleeve 3, the internal bore of which fits closely about the cable 8, will be exposed to any pressure internally of the gland. In contrast to this the larger end of the ring 2 preferably does not extend entirely to the cable 8 but is spaced outwardly thereof to a slight extent.

Projecting in the axial direction from the larger end 33 of the sleeve 3 are vanes 34. These may be considered as spacer vanes, although they have a further function to be explained later. As FIGURE 4 shows best, they are arranged somewhat tangentially with respect to the internal bore of the sleeve 3, at spaced intervals about the end 33. The inclination of vanes 34 at one end of the seal crosses the inclination of the vanes at the opposite end of the seal; see the full and dotted line showings in FIGURE 4.

For ease of installation the sleeve 3 and the ring 2 should each be split longitudinally. The sleeve 3 (see FIGURE 5) is split along a zig-zag line extending generally longitudinally, and indicated at 35. It has been found that such a zig-zag line is best adapted to seal tightly and prevent leakage. The ring 2 is also split longitudinally as indicated at 25, and this may be a zig-zag split or merely a spiral cut. It should be one that has reasonable axial sealing effect when pressure is applied to the larger end of the ring 2. Each of the ring 2 and sleeves 3 being of flexible material, they may be opened readily to receive the cable 8 within their respective bores. However since they are soft and easily deformable, it is desirable to reinforce the ring 2, to which end wire reinforcing loops 22 (see FIGURE 3) are incorporated therein at opposite sides of the split at 25 and at the opposite side of the hinge diametrically opposite the split. Also, it is desirable to incorporate within the larger end face of the ring 2 a split ring 24 of metal or other wear-resistant material which in use will engage a restraining means such, for example, as the radially directed spring pins 4 which project through holes 14 into the bore 12 and engage the metal ring or washer 24. This restraining means is a convenient one for assembly and disassembly, but any convenient form of backstop for the ring 2 may be employed.

Assuming the seal is intended to guard against pressures that may be applied from either side of the bulkhead 9, a seal assembly of the type shown in FIGURE 1 would be employed. A sleeve 3 would be first inserted from each end. Their vanes 34 would cross one another because both are generally tangentially directed alike but they are reversed end for end. These vanes 34 will maintain the larger ends 33 of the sleeves 3 spaced apart, and so will define an annular chamber within the interior of the seal. The cylindrical portion 30 of each sleeve, assisted also by the contact of the peripheral portions of the vanes 34 with the bore 12, will maintain the sleeve in proper axial disposition. The rings 2 are next installed, and spring pins 4 are then inserted through the holes 14 in the tube 1 intended to receive them, and these backstop the larger ends of the rings 2. Now a pressure fluid agent is supplied within the annular chamber between the larger ends of the sleeves 3, this pressure fluid agent being supplied through a valved fitting 5 installed in and passing through the wall of the tube 1 from the exterior and including a spring-seated ball 50.

The fluid pressure agent which is preferred is a silicone paste incorporating a glass flock, or a silicone lubricant in case lubrication within the seal is necessary. This fluid pressure agent will not harden nor oxidize. It acts as a fluid upon the larger ends of the sleeves 3 and urges them apart, and the sleeves in turn react upon the rings 2 to urge the latter axially outwardly against backstops 4, and the radial components thus created react inwardly to urge the sleeves 3 against the cable 8, and the rings 2 outwardly against the bore of the tube 1. The tangentially directed vanes 34, acted upon by the fluid pressure agent being injected, appear to have a tendency to rotate the sleeves 3 whereon they are formed, and such a rotational effect would tend to expel or permit expulsion of the air from the pressure chamber along the channel between the two conical faces and along the other surfaces of the sleeve and ring. Only enough pressure agent is admitted to create an initial pressure that will slightly extrude the smaller end of the sleeve 3 from the larger end of the ring 2, and such extrusion constitutes an indicator that sufficient pressure has been admitted. This pressure is not sufficient in most cases to deform a cable having a soft sheath, and moreover even the portion of such a cable exposed within the annular chamber interiorly of the seal is exposed to the same pressure of the sealant fluid agent, whereby its swelling is prevented.

The external periphery of the ring 2 and the internal bore of the sleeve 3 may be provided with successive circumferential V-grooves 29 and 39 respectively, which by permitting yielding of the respective ring and sleeve will assist in expulsion of air and in more tightly sealing against the respective surfaces of the tube and cable.

Now is external pressure at the left of the bulkhead 9 in FIGURE 1 should be applied in increasing degree against the larger end of the ring 2, which is exposed to such external pressure, this will urge the ring 2 inwardly, and although there will be some slight pressure on the much smaller area of the smaller end of the sleeve 3 to urge it also inwardly, inward movement of the sleeve 3 is resisted by the sealing agent within the internal chamber, which cannot escape and which cannot be compressed. The result is that the external pressure applied to the larger end of the ring 2 reacts to create a higher sealing pressure in the sealant within the annular chamber and applied to the larger end of the sleeve 3, and this holds the seal even more tightly and prevents leakage. The greater the pressure applied to the larger end of ring 2 the greater is the pressure resisting inward movement applied to the even larger end of the sleeve 3 from within the annular chamber. At the same time the pressure of the fluid pressure agent is correspondingly increased.

The particular fluid pressure agent suggested above might be replaced with other suitable agents, but the one preferred and named above does not harden nor oxidize with heat or age and can always be readily disassembled.

In the event the cable 8 should be a slidable or rotative shaft within the sealing assembly it is readily possible to mold hard inserts 38 within the sleeve 3 as indicated in FIGURE 7, to constitute wearing surfaces harder than the material of which the sleeve is made.

In case the seal is to resist higher than normal pressures several sealing assemblies or glands may be arranged in tandem or cascaded, as shown in FIGURE 6. Here the several sealing assemblies are not arranged back to back, but all in the same direction, wherefore a pressure applied to the larger face of a sleeve 3, for instance the face at the right in FIGURE 6, will tend to urge its ring 2 tightly against the bore wall of the tube, but there may be some slight axial movement and this in turn acts through the sealant against the larger end of the second sleeve 3, and so on, each assembly reacting on the next one to increase the pressure thereon until the sealing forces at the innermost of the assemblies is extremely high.

I claim as my invention:

A seal for a cable or the like of given diameter, where it passes through a hole of larger diameter in a bulkhead, comprising a tube of an outside diameter for securement fluid tightly in such hole and of a bore size enough larger than the cable to leave between them an annular space, a resiliently deformable internally tapered ring disposed in said annular space with its exterior fitting closely the tube's bore and its larger end exposed to the pressure to be sealed against, a resiliently deformable sleeve also disposed in said annular space and externally tapered complemental to and fitting within the taper of said ring, and having a bore of a diameter to fit closely about the cable, a closure for the tube's bore adjacent but spaced from the larger end of said sleeve, to leave an annular chamber therebetween, a restraining means reacting from the tube and engaged with the larger end of the ring, means to supply a fluid pressure agent from externally of said tube within said chamber and thus against the larger end of said sleeve, which by reaction from said closure urges the sleeve axially and more tightly within the tapered ring, to produce radial sealing component forces acting upon the cable and the tube's bore, respectively, said closure for the tube's bore comprising a like complemental ring and sleeve pair similarly and reversely disposed so that the larger ends of the two sleeve ends face each other and the pressure agent acts directly thereon to urge them apart, and sets of vanes spaced circumferentially about and projecting in the axial direction from the larger ends of said sleeves towards one another and disposed approximately tangentially of the sleeves' bores, whereby in use the vanes on one sleeve cross those on the other sleeve to maintain their larger ends spaced apart in the absence of pressure within the annular chamber.

References Cited in the file of this patent

UNITED STATES PATENTS

| | | |
|---|---|---|
| 1,779,220 | Strandell | Oct. 21, 1930 |
| 2,238,654 | Maier | Apr. 15, 1941 |
| 2,504,936 | Payne | Apr. 18, 1950 |
| 2,564,912 | McKissick | Aug. 12, 1951 |
| 2,646,959 | Carver | July 28, 1953 |
| 2,733,939 | Scherer | Feb. 7, 1956 |
| 2,816,582 | Van Sneidern | Dec. 17, 1957 |
| 2,944,840 | Wiltse | July 12, 1960 |